(12) United States Patent
Park et al.

(10) Patent No.: US 11,315,729 B2
(45) Date of Patent: Apr. 26, 2022

(54) MULTILAYER CERAMIC CAPACITOR

(71) Applicant: SAMSUNG ELECTRO-MECHANICS CO., LTD., Suwon-si (KR)

(72) Inventors: Jae Sung Park, Suwon-si (KR); Jeong Ryeol Kim, Suwon-si (KR); In Tae Seo, Suwon-si (KR); Jong Han Kim, Suwon-si (KR); Hyung Soon Kwon, Suwon-si (KR); Hee Sun Chun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 36 days.

(21) Appl. No.: 16/887,167

(22) Filed: May 29, 2020

(65) Prior Publication Data

US 2021/0142945 A1   May 13, 2021

(30) Foreign Application Priority Data

Nov. 8, 2019 (KR) .......................... 10-2019-0142465

(51) Int. Cl.
*H01G 4/008* (2006.01)
*H01G 4/12* (2006.01)
(Continued)

(52) U.S. Cl.
CPC ............. *H01G 4/008* (2013.01); *H01G 4/012* (2013.01); *H01G 4/1227* (2013.01); *H01G 4/30* (2013.01)

(58) Field of Classification Search
CPC .................. H01B 3/12; C04B 35/4682; C04B 2235/3206; C04B 2235/3208;
(Continued)

(56) References Cited

U.S. PATENT DOCUMENTS

| 2009/0310279 A1* | 12/2009 | Sasabayashi | ....... C04B 35/4682 |
| | | | 361/321.4 |
| 2015/0287535 A1* | 10/2015 | Nakanishi | ............ H01G 4/1245 |
| | | | 361/301.4 |

(Continued)

FOREIGN PATENT DOCUMENTS

| EP | 0 820 074 A1 | 1/1998 |
| JP | 2000-26161 A | 1/2000 |

(Continued)

*Primary Examiner* — Michael P McFadden
(74) *Attorney, Agent, or Firm* — Morgan, Lewis & Bockius LLP

(57) ABSTRACT

A multilayer ceramic capacitor includes a ceramic body including first and second surfaces opposing each other, and third and fourth surfaces connecting the first and second surfaces, a plurality of internal electrodes disposed inside the ceramic body, exposed from the first and second surfaces, and having an end exposed from the third surface or the fourth surface, and a first side margin and a second side margin respectively disposed on the first and second surfaces, from which end portions of the plurality of internal electrodes are exposed. The first and second side margins include a base material powder of a barium titanate-based base powder and a subcomponent. The subcomponent includes terbium (Tb) as a first subcomponent including a lanthanide rare earth element, and a content ratio of the terbium (Tb) to a content of the first subcomponent (RE) excluding the terbium (Tb) satisfies $0.110 \leq Tb/RE \leq 2.333$.

20 Claims, 6 Drawing Sheets

I-I'

(51) Int. Cl.
*H01G 4/012* (2006.01)
*H01G 4/30* (2006.01)

(58) Field of Classification Search
CPC .... C04B 2235/3215; C04B 2235/3224; C04B 2235/3236; C04B 2235/3463; H01G 4/012; H01G 4/1227; H01G 4/232; H01G 4/30; H01G 4/2325; H01G 4/1209; H01G 4/228; H01G 4/306
See application file for complete search history.

(56) References Cited

U.S. PATENT DOCUMENTS

| | | | |
|---|---|---|---|
| 2016/0196918 A1* | 7/2016 | Hong | H01G 4/232 |
| | | | 174/260 |
| 2016/0358711 A1* | 12/2016 | Oguni | C04B 35/465 |
| 2017/0178812 A1* | 6/2017 | Shimada | H01G 4/1227 |
| 2019/0115153 A1* | 4/2019 | Park | H01G 4/1227 |

FOREIGN PATENT DOCUMENTS

| | | |
|---|---|---|
| KR | 10-1998-0009197 A | 4/1998 |
| KR | 10-2010-0136917 A | 12/2010 |

\* cited by examiner

I-I'

II-II'

MULTILAYER CERAMIC CAPACITOR

CROSS-REFERENCE TO RELATED APPLICATION(S)

This application claims benefit of priority to Korean Patent Application No. 10-2019-0142465 filed on Nov. 8, 2019 in the Korean Intellectual Property Office, the disclosure of which is incorporated herein by reference in its entirety.

TECHNICAL FIELD

The present disclosure relates to a multilayer ceramic capacitor and a method of manufacturing the same, and more particularly, to a multilayer ceramic capacitor in which mechanical strength may be improved and high temperature and moisture resistance may be improved, and a method of manufacturing the same.

BACKGROUND

In general, electronic components using a ceramic material, such as capacitors, inductors, piezoelectric elements, varistors, or thermistors, include a ceramic body formed of a ceramic material, an internal electrode formed inside the body, and an external electrode installed on the surface of the ceramic body to be connected to the internal electrode.

Recently, as electronic products have become miniaturized and multifunctional, chip components are also miniaturized and highly functionalized, and thus, high capacity products, for example, multilayer ceramic capacitors having small sizes and high capacities, are required.

For miniaturization and high capacitance of multilayer ceramic capacitors, it is necessary to secure a dielectric material having good dielectric properties and excellent withstand voltage characteristics.

In addition, thinning of a dielectric and a significant increase in an electrode effective area (increasing the effective volume fraction required for capacity implementation) are required.

However, a local reduction in dielectric thickness may occur due to the thinning of the dielectric and the marginal step difference, and thus, a structural design change to significantly reduce a withstand voltage drop phenomenon occurring due to such a local reduction is essential.

To implement a small-sized and high capacity multilayer ceramic capacitor as described above and to prevent a withstand voltage drop phenomenon, in manufacturing a multilayer ceramic capacitor, there is a method in which the internal electrode is exposed in the width direction of the body, thereby significantly increasing the internal electrode area in the width direction through a marginless design, and a separate margin portion is attached to the electrode exposed surface of the chip in the width direction, in the operation before firing after chip fabrication as above.

However, when the multilayer ceramic capacitor is manufactured as described above, the dielectric composition of the ceramic body is used as is without differentiating the dielectric composition of the side margin from the dielectric composition of the ceramic body.

Therefore, there is a problem in which the interface gap between the electrode end portion and the margin portion join surface is not filled, the interface gap being inevitably generated due to the problem of lowering the densification of the side margin and the sintering drive mismatching phenomenon of the dielectric of the side margin and the internal electrode during the sintering process.

In addition, since in the related art, a ceramic dielectric sheet that acts as a margin is attached to a green chip cut without a margin, by physical compression, and then a sintered body having a rigid body is formed through a high temperature heat treatment. Thus, in this case, when the adhesive force between the electrode exposed surface and the sheet for forming a margin portion in the operation before sintering is insufficient, poor appearance due to removal of margin and serious defects leading to interfacial cracks may occur.

In addition, voids are generated between the electrode end and the margin interface when the volume change occurs inside the chip due to shrinkage of the internal electrode during high temperature heat treatment, acting as a starting point of crack generation or as a moisture penetration path, thereby causing a decrease in moisture resistance reliability.

In addition, to solve the above problems, when the material with high sintering driving force is applied as a general method, the aggregation of an outermost internal electrode near the interface due to excessive grain growth is intensified, resulting in increasing a drop in withstand voltage due to the electrode and dielectric layer unevenness.

Therefore, the dielectric of the margin region should have an excellent sintering driving force, so that the same sintered-body density as that of the ceramic body may be ensured, even with a low physical filling density, thereby significantly reducing the decrease in the strength of the multilayer ceramic capacitor.

In addition, the dielectric used in the margin region should be able to more actively move the material at a high temperature to fill the interface void.

In addition, the interface bonding force should be improved by forming an oxide layer on the end joining surface by reaction with the internal electrode.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a high capacity multilayer ceramic capacitor in which mechanical strength and high temperature and moisture resistance may be improved, and a method of manufacturing the same.

According to an aspect of the present disclosure, a multilayer ceramic capacitor includes a ceramic body including first and second surfaces opposing each other, and third and fourth surfaces connecting the first and second surfaces, a plurality of internal electrodes disposed inside the ceramic body, exposed from the first and second surfaces, and having an end exposed from the third surface or the fourth surface, and a first side margin and a second side margin respectively disposed on the first and second surfaces, from which end portions of the plurality of internal electrodes are exposed. The first and second side margins include a base material powder of a barium titanate-based base powder and a subcomponent. The subcomponent includes terbium (Tb) as a first subcomponent including a lanthanide rare earth element, and a content ratio of the terbium (Tb) to a content of the first subcomponent (RE) excluding the terbium (Tb) satisfies $0.110 \leq Tb/RE \leq 2.333$.

According to an aspect of the present disclosure, a multilayer ceramic capacitor includes a ceramic body including first and second surfaces opposing each other, and third and fourth surfaces connecting the first and second surfaces, a plurality of internal electrodes disposed inside the ceramic body, exposed from the first and second surfaces, and having an end exposed from the third surface or the fourth surface, and a first side margin and a second side margin respectively disposed on the first and second surfaces, from which end portions of the plurality of internal electrodes are exposed. The first and second side margins include a base material powder of a barium titanate-based base powder and a subcomponent. The subcomponent includes terbium (Tb) as a first subcomponent including a lanthanide rare earth element. A content ratio of the terbium (Tb) to a content of the first subcomponent (RE) excluding the terbium (Tb) satisfies $0.110 \leq Tb/RE \leq 2.333$. A dielectric composition included in the first and second side margins and a dielectric composition included in the ceramic body are different from each other, and a content of the terbium (Tb) included in the first and second side margins is more than a content of terbium (Tb) included in the ceramic body. A content ratio of the terbium (Tb) included in the first and second side margins to a content of the base material powder included in the first and second side margins, is greater than a content ratio of terbium (Tb) included in the ceramic body to a content of a barium titanate-based base powder included in the ceramic body According to an aspect of the present disclosure, a multilayer ceramic capacitor includes a ceramic body including first and second surfaces opposing each other, and third and fourth surfaces connecting the first and second surfaces, a plurality of internal electrodes disposed inside the ceramic body, exposed from the first and second surfaces, and each having an end exposed from the third surface or the fourth surface, and a first side margin and a second side margin respectively disposed on the first and second surfaces, from which end portions of the plurality of internal electrodes are exposed. The first and second side margins include a base material powder of a barium titanate-based base powder and a subcomponent. The subcomponent includes terbium (Tb) and one or more other lanthanide rare earth elements as a first subcomponent. A content ratio of the terbium (Tb) included in the first and second side margins to a content of the base material powder included in the first and second side margins, is greater than a content ratio of terbium (Tb) included in the ceramic body to a content of a barium titanate-based base powder included in the ceramic body. A content of the terbium (Tb) satisfies $0.15 \text{ mol} \leq Tb \leq 1.35 \text{ mol}$ with respect to 100 mol of the base material powder included in the first and second side margins.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
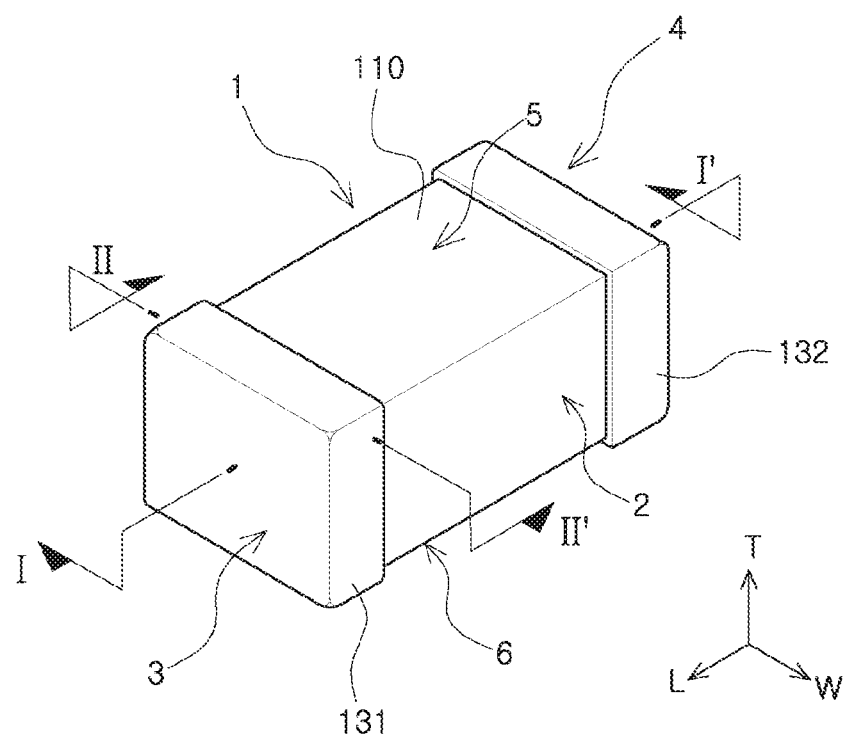
FIG. 1 is a schematic perspective view illustrating a multilayer ceramic capacitor according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

FIG. 1 is a schematic perspective view illustrating a multilayer ceramic capacitor according to an embodiment.

Figure 2:
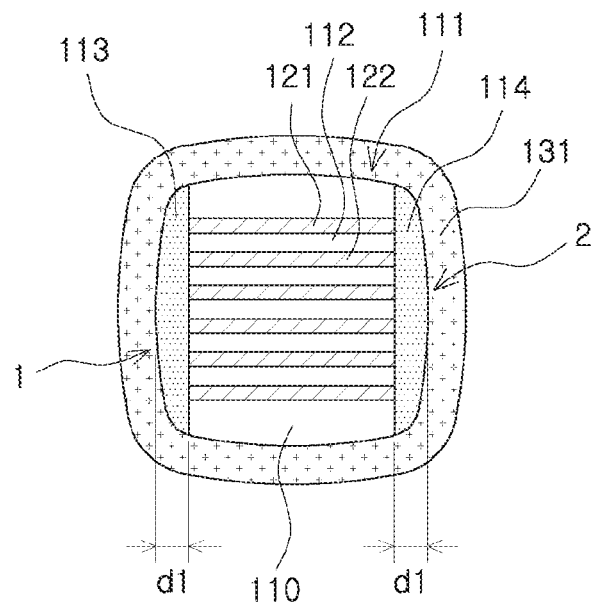
FIG. 2 is a cross-sectional view taken along line I-I' of FIG. 1.

FIG. 2 is a cross-sectional view taken along line I-I' of FIG. 1.

Figure 3:
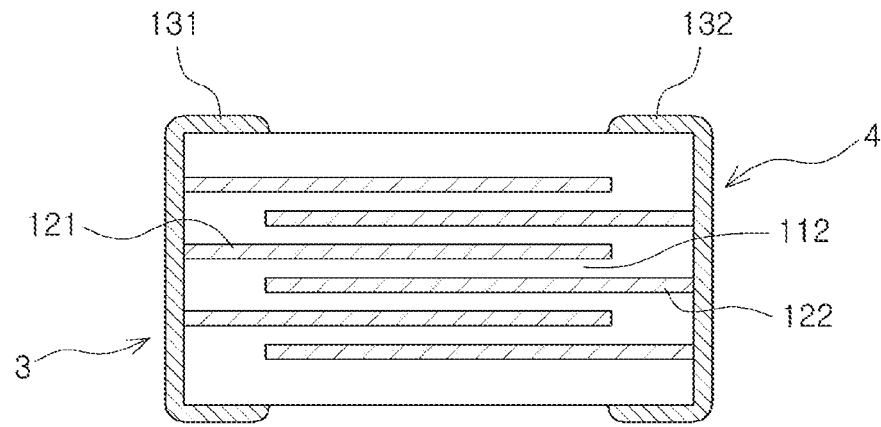
FIG. 3 is a cross-sectional view taken along line II-II' of FIG. 1.

FIG. 3 is a cross-sectional view taken along line II-II' of FIG. 1.

Figure 4:
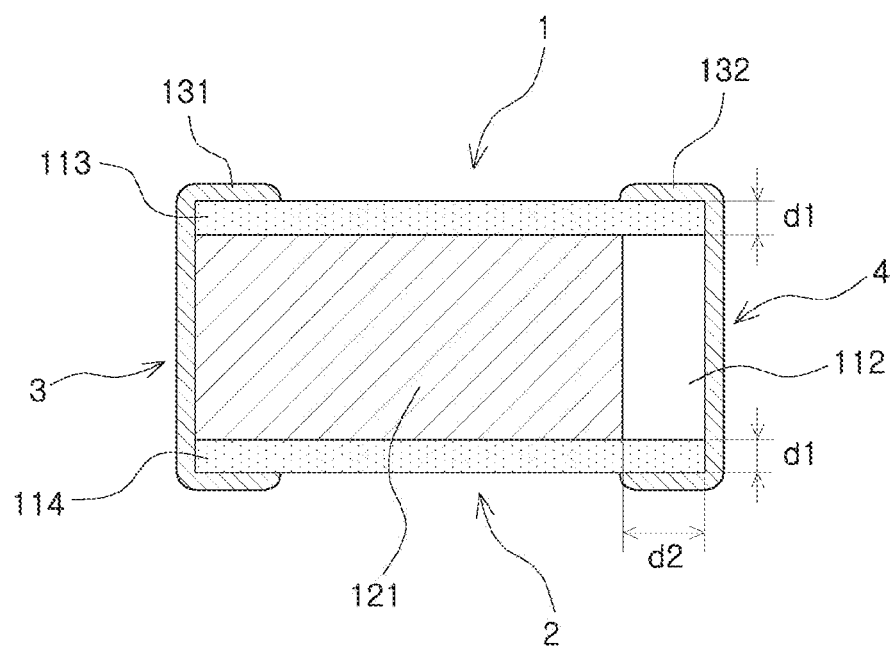
FIG. 4 is a top plan view illustrating one dielectric layer constituting the multilayer ceramic capacitor illustrated in FIG. 1.

FIG. 4 is a top plan view illustrating one dielectric layer constituting the multilayer ceramic capacitor illustrated in FIG. 1.

FIGS. 5A to 5F are cross-sectional views and perspective views schematically illustrating a method of manufacturing a multilayer ceramic capacitor according to another embodiment.

Referring to FIGS. 1 to 4, a multilayer ceramic capacitor according to an embodiment includes a ceramic body 110, a plurality of internal electrodes 121 and 122 formed in the ceramic body 110, and external electrodes 131 and 132 formed on external surfaces of the ceramic body 110.

The ceramic body 110 has a first surface 1 and a second surface 2 opposing each other, and a third surface 3 and a fourth surface 4 connecting the first and second surfaces to each other, and a fifth surface 5 and a sixth surface 6, which are an upper surface and a lower surface.

The first surface 1 and the second surface 2 may be defined as surfaces opposing each other in the width direction (W direction) of the ceramic body 110, while the third surface 3 and the fourth surface 4 may be defined as surfaces opposing each other in the length direction (X direction). The fifth surface 5 and the sixth surface 6 may be defined as surfaces opposing in the thickness direction (Z direction).

The shape of the ceramic body 110 is not particularly limited, but may be a rectangular parallelepiped shape as illustrated in the drawings.

Ends of the plurality of internal electrodes 121 and 122 formed in the ceramic body 110 are exposed to the third surface 3 or the fourth surface 4 of the ceramic body.

The internal electrodes (121 and 122) may be provided as a pair of first internal electrode 121 and second internal electrode 122 having different polarities.

One end of the first internal electrode 121 may be exposed to the third surface 3, and one end of the second internal electrode 122 may be exposed to the fourth surface 4.

The other ends of the first internal electrode 121 and the second internal electrode 122 are formed at a predetermined distance from the third surface 3 or the fourth surface 4, which will be described in more detail later.

First and second external electrodes 131 and 132 may be formed on the third surface 3 and the fourth surface 4 of the ceramic body to be electrically connected to the internal electrodes.

The multilayer ceramic capacitor according to an embodiment includes the plurality of internal electrodes 121 and 122 disposed inside the ceramic body 110, exposed to the first and second surfaces 1 and 2 and having one end to the third surface 3 or the fourth surface, and a first side margin 113 and a second side margin 114 disposed on the end portions of the internal electrodes 121 and 122 exposed to the first surface 1 and the second surface 2.

The plurality of internal electrodes 121 and 122 are formed in the ceramic body 110, and respective ends of the plurality of internal electrodes 121 and 122 are exposed to the first surface 1 and the second surface 2, which are the surfaces of the ceramic body 110 in the width direction. The first side margin 113 and the second side margin 114 are disposed on the exposed end portions, respectively.

A thickness d1 of the first side margin 113 and a thickness d1 of the second side margin 114 may be 18 µm or less.

According to an embodiment, the ceramic body 110 may be comprised of a laminate 111 in which a plurality of dielectric layers 112 are laminated, and the first side margin portion 113 and the second side margin 114 formed on both sides of the laminate.

The plurality of dielectric layers 112 constituting the laminate 111 are in a sintered state and may be integrated so that boundaries between adjacent dielectric layers cannot be identified.

The length of the laminate 111 corresponds to the length of the ceramic body 110, the length of the ceramic body 110 corresponds to the distance from the third surface 3 to the fourth surface 4 of the ceramic body 110. For example, the third and fourth surfaces 3 and 5 of the ceramic body 110 may be understood as the third and fourth surfaces of the laminate 111.

The laminate 111 is formed by stacking the plurality of dielectric layers 112, and the length of the dielectric layer 112 forms a distance between the third surface 3 and the fourth surface 4 of the ceramic body.

Although not particularly limited, according to an embodiment, the length of the ceramic body may be 400 to 1400 µm. In more detail, the length of the ceramic body may be 400 to 800 µm or 600 to 1400 µm.

The internal electrodes 121 and 122 may be formed on the dielectric layers, and the internal electrodes 121 and 122 may be formed in the ceramic body 110 with one dielectric layer 112 interposed therebetween by sintering.

Referring to FIG. 4, the first internal electrode 121 is formed on the dielectric layer 112. The first internal electrode 121 is not entirely formed in the length direction of the dielectric layer. For example, one end of the first internal electrode 121 may be formed at a predetermined distance d2 from the fourth surface 4 of the ceramic body 110, and the other end of the first internal electrode 121 may be formed on the third surface 3, to be exposed to the third surface 3.

The other end of the first internal electrode exposed to the third surface 3 of the laminate is connected to the first external electrode 131.

In contrast to the first internal electrode, one end of the second internal electrode 122 is formed at a predetermined distance from the third surface 3, and the other end of the second internal electrode 122 is exposed to the fourth surface 4 to be connected to the second external electrode 132.

The dielectric layer 112 may have the same width as that of the first internal electrode 121. For example, the first internal electrode 121 may be formed as a whole in the width direction of the dielectric layer 112.

Although not particularly limited, according to an embodiment, the width of the dielectric layer and the width of the internal electrode may be 100 to 900 μm. In more detail, the width of the dielectric layer and the width of the internal electrode may be 100 to 500 μm or 100 to 900 μm.

As the ceramic body becomes smaller, the thickness of the side margin may affect the electrical characteristics of the multilayer ceramic capacitor. According to an embodiment, the side margin may have a thickness of 18 μm or less, thereby improving characteristics of the miniaturized multilayer ceramic capacitor.

In an embodiment, the internal electrode and the dielectric layer are formed by being cut at the same time, and the width of the internal electrode and the width of the dielectric layer may be the same as each other. More details with regard thereto will be described later.

In this embodiment, the width of the dielectric layer is formed to be the same as that of the internal electrode, and thus the ends of the internal electrodes 121 and 122 may be exposed to the first and second surfaces of the ceramic body 110 in the width direction.

The first side margin 113 and the second side margin 114 may be formed on both side surfaces of the ceramic body 110 in the width direction, to which the ends of the internal electrodes 121 and 122 are exposed.

The thickness of the first side margin 113 and the second side margin 114 may be 18 μm or less. As the thickness of the first side margin 113 and the second side margin 114 is smaller, the overlapping area of the internal electrodes formed in the ceramic body may be further increased.

The thickness of the first side margin 113 and the second side margin 114 is not particularly limited as long as it has a thickness that may prevent the short of the internal electrode exposed to the side of the laminate 111. For example, the thicknesses of the first side margin 113 and the second side margin 114 may be 2 μm or more.

If the thickness of each of the first and second side margins is less than 2 μm, the mechanical strength against external impact may be lowered. If the thickness of each of the first and second side margins is more than 18 μm, the overlapping area of the internal electrodes may be relatively reduced, and thus, it may be difficult to secure the high capacity of the multilayer ceramic capacitor.

To significantly increase the capacity of the multilayer ceramic capacitor, a method of thinning the dielectric layer, a method of high lamination of the thinned dielectric layers, a method of improving the coverage of the internal electrode, and the like have been considered.

In addition, a method of improving the overlap area of the internal electrodes forming the capacitance has been considered.

To increase the overlapping area of the internal electrodes, the margin area in which the internal electrodes are not formed should be significantly reduced.

In detail, as the multilayer ceramic capacitor becomes smaller, the margin area should be significantly reduced to increase the overlapping area of the internal electrodes.

According to this embodiment, the internal electrode is formed entirely in the width direction of the dielectric layer, and the thickness of the side margin is set to 18 μm or less, so that the overlapping area of the internal electrodes is relatively wide.

In general, the more the dielectric layers are highly laminated, the thinner the thickness of the dielectric layer and the internal electrode. Therefore, a phenomenon in which the internal electrode is shorted may occur more frequently. In addition, when the internal electrode is formed only on a portion of the dielectric layer, a step difference may occur due to the internal electrode, thereby increasing accelerated lifespan of the insulation resistance.

However, according to this embodiment, even when the internal electrode and the dielectric layer of the thin film are formed, since the internal electrode is formed entirely in the width direction of the dielectric layer, the overlapping area of the internal electrodes may be increased to increase the capacity of the multilayer ceramic capacitor.

In addition, a multilayer ceramic capacitor may have excellent capacitance characteristics and excellent reliability by reducing the step difference caused by the internal electrodes, to reduce accelerated lifespan of the insulation resistance.

On the other hand, in manufacturing a multilayer ceramic capacitor, in the related art, the dielectric composition of the ceramic body is used without differentiating the dielectric composition for forming the side margins from the dielectric composition of the ceramic body.

Thus, in this case, the physical packing density of the dielectric in the side margin is relatively low, thereby causing a problem in which the densification of the side margin is reduced, and due to the mismatching phenomenon of the sintering drive between the internal electrode and the dielectric of the side margin during the sintering process, there arises a problem in which the interface gap between the electrode end portion and the margin junction surface, inevitably generated, may not be filled.

In addition, the ceramic dielectric sheet serving as the side margin is attached to the green chip cut without the margin portion by physical compression, and then, the sintered body having a rigid body is formed through high temperature heat treatment. Thus, in a case in which the adhesive force between the electrode exposed surface and the sheet for forming margins in operation before sintering is insufficient, poor appearance due to side margin removal and serious defects leading to interfacial cracks may occur.

In addition, voids are generated between the electrode end and the margin interface when the volume change occurs inside the chip due to shrinkage of the internal electrode during high temperature heat treatment, acting as a starting point of crack generation or as a moisture penetration path, thereby causing a decrease in moisture resistance reliability.

Therefore, the dielectric of the margin region should have an excellent sintering driving force, so that the same sintered-body density as that of the ceramic body may be ensured, even with a low physical filling density, thereby significantly reducing the decrease in the strength of the multilayer ceramic capacitor.

In addition, the dielectric used in the margin region should be able to more actively move the material at a high temperature to fill the interface void.

In addition, the interface bonding force should be improved by forming an oxide layer on the end joining surface by reaction with the internal electrode.

According to an embodiment of the present disclosure, the dielectric composition included in the first and second side margins 113 and 114 and the dielectric composition included in the ceramic body 110 are different from each other.

The first and second side margins 113 and 114 include a barium titanate base material powder and a subcomponent, and the subcomponent includes terbium (Tb) as a first subcomponent including a lanthanide rare earth element. The content ratio of the terbium (Tb) to the content of the first subcomponent (RE) excluding the terbium (Tb) satisfies $0.110 \leq Tb/RE \leq 2.333$. In one example, the content ratio of the present disclosure may refer to a mole ratio.

The first and second side margins 113 and 114 include a barium titanate base material powder and a subcomponent, and the subcomponent includes terbium (Tb) as a first subcomponent including a lanthanide rare earth element, and the above problem may be solved by adjusting the content ratio of terbium (Tb) to the content of the first subcomponent (RE) except for the terbium (Tb) to satisfy $0.110 \leq Tb/RE \leq 2.333$.

In detail, according to an embodiment, a decrease in the interfacial adhesion between the internal electrode and the margin portion may be prevented, and the generation of voids between the internal electrode and the margin portion may be prevented, thereby improving reliability.

In addition, uniform oxide layer and insulating layer may be secured on the end of the internal electrode, to reduce short defects, and the density of the margin portion may be improved, and the mechanical strength of the multilayer ceramic capacitor and the high temperature/moisture reliability may be improved.

If the content ratio (Tb/RE) of the terbium (Tb) to the content of the first subcomponent (RE) excluding the terbium (Tb) is less than 0.110, the content of terbium (Tb) is relatively small and thus, voids generated between the internal electrode and the margin portion may not be effectively filled, degrading reliability.

If the content ratio (Tb/RE) of the terbium (Tb) to the content of the first subcomponent (RE) excluding the terbium (Tb) exceeds 2.333, the content of terbium (Tb) is excessive. Thus, there is a side effect accompanied by a decrease in dielectric layer insulation resistance due to an increase in leakage current due to the electron emission phenomenon by the reaction formula.

According to an embodiment, the content of the terbium (Tb) included in the first and second side margins 113 and 114 may satisfy $0.15 \text{ mol} \leq Tb \leq 1.35 \text{ mol}$ with respect to 100 mol of the base material powder included in the first and second side margins 113 and 114.

Since the content of the terbium (Tb) included in the first and second side margins 113 and 114 satisfies $0.15 \text{ mol} \leq Tb \leq 1.35 \text{ mol}$ with respect to 100 mol of the base metal powder included in the first and second side margins 113 and 114, a decrease in the interface adhesion between the internal electrode and the margin portion may be prevented and the reliability may be improved by preventing the generation of voids between the internal electrode and the margin.

In addition, the uniform oxide layer and insulating layer may be secured on the end of the internal electrode, to reduce short defects, to improve the density of the margin portion, and to improve the mechanical strength of the multilayer ceramic capacitor and improve the high temperature/moisture reliability.

If the content of terbium (Tb) is less than 0.15 mol compared to 100 mol of the base metal powder, the content of terbium (Tb) may be relatively small so that the gap between the internal electrode and the margin may not be effectively filled and reliability may be deteriorated.

If the content of terbium (Tb) exceeds 1.35 mol relative to 100 mol of the base metal powder, the content of terbium (Tb) is excessive, and due to an increase in leakage current due to electron emission generated by a defect chemical reaction equation, there is a side effect accompanied by a decrease in dielectric layer insulation resistance.

According to an embodiment of the present disclosure, the subcomponent includes magnesium (Mg) and barium (Ba), and the content ratio of magnesium (Mg) to content of the barium (Ba) may satisfy $0.125 \leq Mg/Ba \leq 0.500$.

The subcomponent includes magnesium (Mg) and barium (Ba), by adjusting the content ratio of the magnesium (Mg) to the content of the barium (Ba) to satisfy $0.125 \leq Mg/Ba \leq 0.500$, the interfacial adhesion between the internal electrode and the margin may be prevented from decreasing, and the reliability may be improved by preventing the formation of voids between the internal electrode and the margin.

In addition, the uniform oxide layer and insulating layer may be secured on the end of the internal electrode, to reduce short defects, to improve the density of the margin portion, and to improve the mechanical strength of the multilayer ceramic capacitor and improve the high temperature/moisture reliability.

If the content ratio (Mg/Ba) of the magnesium (Mg) to the content of the barium (Ba) is less than 0.125, problems such as deterioration of the density of margins, generation of interfacial voids, and uneven thicknesses of dielectric and internal electrode ends occur, and reliability may be degraded.

If the content ratio (Mg/Ba) of the magnesium (Mg) to the content of the barium (Ba) exceeds 0.500, the dielectric properties may decrease.

The content of magnesium (Mg) may satisfy $0.25 \text{ mol} \leq Mg \leq 1.0 \text{ mol}$ compared to 100 mol of the base material powder.

By adjusting the content of magnesium (Mg) to satisfy $0.25 \text{ mol} \leq Mg \leq 1.0 \text{ mol}$ compared to 100 mol of the base material powder, the degradation of the interfacial adhesion between the internal electrode and the margin portion may be prevented, the generation of voids between the internal electrode and the margin portion may be prevented, thereby improving the reliability.

In addition, it is possible to secure uniform oxide layer and insulating layer on the end of the internal electrode, to reduce short defects, to improve the density of the margin portion, and to improve the mechanical strength of the multilayer ceramic capacitor and improve the high temperature/moisture reliability.

If the content of magnesium (Mg) is less than 0.25 mol compared to 100 mol of the base metal powder, problems such as deterioration of margin density, generation of interfacial voids, and nonuniform thicknesses of the dielectric and internal electrode ends may occur, thereby reducing the reliability.

If the content of the magnesium (Mg) exceeds 1.0 mol compared to 100 mol of the base metal powder, dielectric properties may decrease.

As described above, the internal electrode is exposed in the width direction of the body, thereby significantly increasing the internal electrode area in the width direction through a margin-free design. In this case, in the case of manufacturing a multilayer ceramic capacitor by a method of separately attaching a margin portion to the electrode exposed surface of the chip in the width direction in the operation before firing after the fabrication of the chip, the upper and lower electrodes may be connected by the sliding phenomenon of the internal electrode exposed surface during the cutting process of the internal electrode exposed surface, which may cause a short circuit and a decrease in withstand voltage.

In addition, physical/chemical phenomena in which an interface is opened may occur due to a spontaneous reaction to lower surface energy due to a reduction in specific surface area during sintering at an interface at the time of performing heterojunction a metal and a ceramic.

Therefore, to solve both of these problems, it is necessary to select an element capable of forming a uniform oxide layer without forming a secondary phase, while having high affinity with nickel (Ni) used as an internal electrode and thus being easily able to be solid dissolved.

According to an embodiment of the present disclosure, with the same structure as NiO composed of a NaCl structure in which the cation and anion ratio is 1:1, and simultaneously, by controlling the absolute content ratio of Mg oxide having a high oxygen affinity, the bonding force with the side margin ceramic by generation of the oxide layer may be increased in addition to the even formation of an insulating layer on the nickel (Ni) electrode end.

In this case, in a case in which the content ratio of Mg exceeds an optimum composition ratio, the sinterability may be lowered and to be lowered due to the excessive Mg addition or the withstand voltage may decrease due to the generation of the secondary phase. Thus, the selection of the content ratio may be significantly important.

In addition, to further improve the withstand voltage of the multilayer ceramic capacitor including moisture resistance and to suppress crack generation, the densities of side margins should be secured, and the voids of electrode ends should be effectively filled. To this end, improving sintering driving force and inducing active mass transport at high temperatures are required.

The content of the barium (Ba) may satisfy $0.5 \text{ mol} \leq Ba \leq 3.0 \text{ mol}$ with respect to 100 mol of the base material powder.

Detailed description of the content of the barium (Ba) will be described later.

According to an embodiment of the present disclosure, the subcomponent may include a second subcomponent which is an oxide or carbonate containing the Ba, and a third subcomponent with a content greater than 0.0 and less than 4.5 mol, including at least one of a carbonate or oxide having at least one of silicon (Si) or aluminum (Al), or glass compounds containing Si, with respect to 100 mol of the base material powder. The content ratio of the magnesium (Mg) relative to the total content of the barium (Ba) and silicon (Si) may satisfy $0.09 \leq Mg/(Ba+Si) \leq 0.19$.

By adjusting the content ratio of the magnesium (Mg) to the total content of the barium (Ba) and silicon (Si) to satisfy $0.09 \leq Mg/(Ba+Si) \leq 0.19$, the formation of voids between the internal electrode and the margin may be prevented, thereby improving reliability.

In addition, a uniform oxide layer and an insulating layer may be secured on the end of the internal electrode, to reduce short defects, to improve the density of the margin portion, and to improve the mechanical strength of the multilayer ceramic capacitor and improve the high temperature/moisture reliability.

If the content ratio (Mg/(Ba+Si)) of the magnesium (Mg) to the total content of the barium (Ba) and silicon (Si) is less than 0.09, problems such as deterioration of the density of margins and generation of interface voids occur, and reliability may decrease.

If the content ratio (Mg/(Ba+Si)) of magnesium (Mg) to the total content of barium (Ba) and silicon (Si) exceeds 0.19, the dielectric characteristics may be degraded by excessive diffusion of magnesium (Mg) into the active dielectric layer.

In detail, since barium (Ba) and silicon (Si) are important minor components that determine densification at low temperature by liquid phase sintering or the solubility limit in the $BaTiO_3$ lattice such as terbium (Tb), magnesium (Mg) or the like, based on the eutectic line of binary phase diagrams in the two-element system, the interrelationship of the addition ratio thereof with terbium (Tb) and magnesium (Mg) may be important.

According to an embodiment of the present disclosure, the dielectric composition included in the first and second side margins 113 and 114 and the dielectric composition included in the ceramic body 110 are different from each other. The dielectric composition included in the first and second side margins 113 and 114 will be described.

a) Base Material Main Component

A dielectric ceramic composition included in the first and second side margins 113 and 114 according to an embodiment of the present disclosure may include a base material main component including barium (Ba) and titanium (Ti).

According to an embodiment, the base material main component is $BaTiO_3$ or a main component represented by (Ba, Ca) (Ti, Ca) $O_3$, (Ba, Ca) (Ti, Zr) $O_3$, Ba (Ti, Zr) $O_3$, or (Ba, Ca) (Ti, Sn) $O_3$, in which Ca, Zr, Sn, or the like is partially dissolved. The base material main component may be included in powder form.

b) First Subcomponent

According to an embodiment, terbium (Tb) is included as a first subcomponent containing a lanthanide rare earth element, and in addition thereto, the first subcomponent having a content of greater than 0.0 and less than or equal to 4.0 mol, may be included, which is an oxide or carbonate including at least one of yttrium (Y), dysprosium (Dy), holmium (Ho), erbium (Er), gadolinium (Gd), cerium (Ce), neodymium (Nd), samarium (Sm), lanthanum (La), ytterbium (Yb) and praseodymium (Pr) with respect to 100 mol of the base metal powder.

The content of the first subcomponent may be provided based on the content of at least one of Tb, Y, Dy, Ho, Er, Gd, Ce, Nd, Sm, La, Yb and Pr included in the first subcomponent without distinguishing an addition form such as an oxide or a carbonate.

For example, the sum of the contents of at least one or more elements among Tb, Y, Dy, Ho, Er, Gd, Ce, Nd, Sm, La, Yb, and Pr included in the first subcomponent may be less than or equal to 4.0 mol, to 100 mol of the base material main component.

The first subcomponent prevents deterioration of reliability of the multilayer ceramic capacitor to which the dielectric ceramic composition is applied in one embodiment.

If the content of the first subcomponent exceeds 4.0 mol with respect to 100 mol of the base material main component, high temperature withstand voltage characteristics may be degraded due to pyrochlor ($RE_2Ti_2O_7$) (where RE is at least one or more elements among Y, Dy, Ho, Er, Gd, Ce, Nd, Sm, La, Yb, and Pr) secondary phase.

c) Second Subcomponent

According to an embodiment of the present disclosure, the dielectric ceramic composition may include a second subcomponent including one or more selected from the group consisting of oxides and carbonates, a Mg element.

The second subcomponent may be included in an amount of 0.5 mol≤Mg≤3.0 mol with respect to 100 mol of the base material powder.

The content of the second subcomponent may be based on the content of Mg element included in the second subcomponent without distinguishing an addition form such as an oxide or a carbonate.

When the second subcomponent is included in an amount of 0.5 mol≤Mg≤3.0 mol with respect to 100 mol of the base material powder, high temperature withstand voltage characteristics may be improved.

d) Third Subcomponent

According to an embodiment, the dielectric ceramic composition may include a third subcomponent including at least one of an oxide or carbonate including at least one of Si, Ba and Al, or a glass compound including Si.

The third subcomponent may be included in an amount of more than 0.0 and less than 4.5 mol with respect to 100 mol of the base material powder.

The content of the third subcomponent may be based on the content of Si, Ba or Al elements included in the third subcomponent without distinguishing an addition form such as glass, oxide, or carbonate.

If the content of the third subcomponent is included in the amount of 4.5 mol or more with respect to 100 mol of the base metal powder, there may be problems such as lowering of sintering property and density, secondary phase generation, and the like.

A multilayer ceramic capacitor according to another embodiment includes a ceramic body including a first surface and a second surface opposing each other, and a third surface and a fourth surface connecting the first and second surfaces to each other, a plurality of internal electrodes disposed inside the ceramic body, exposed to the first and second surfaces, and having an end exposed to the third or fourth surface, and a first side margin and a second side margin disposed on end portions of the internal electrodes exposed to the first and second surfaces, respectively. The first and second side margins include a barium titanate base material powder and a subcomponent, and the subcomponent includes Terbium (Tb) as one subcomponent including a lanthanide rare earth element. In the first and second side margins, the content ratio of the terbium (Tb) to the content of the first subcomponent (RE) excluding the terbium (Tb) satisfies 0.110≤Tb/RE≤2.333. A dielectric composition included in the first and second side margins and a dielectric composition included in the ceramic body are different from each other. The content of the terbium (Tb) included in the first and second side margins is greater than the content of terbium (Tb) in the ceramic body. For example, a content ratio of the terbium (Tb) included in the first and second side margins to a content of the base material powder included in the first and second side margins, may be greater than a content ratio of terbium (Tb) included in the ceramic body to a content of a base material powder such as a barium titanate-based base powder included in the ceramic body.

According to another embodiment, the dielectric composition included in the first and second side margins 113 and 114 and the dielectric composition included in the ceramic body 110 are different from each other. The first and second side margins 113 and 114 include a barium titanate base material powder and a subcomponent, and the subcomponent includes terbium (Tb) as a first subcomponent including a lanthanide rare earth element, and the content ratio of the terbium (Tb) to the content of the first subcomponent (RE) except for the terbium (Tb) satisfies 0.110≤Tb/RE≤2.333, and the content ratio of the terbium (Tb) included in the first and second side margins 113 and 114 is more than the content ratio of terbium (Tb) contained in the ceramic body 110.

In the multilayer ceramic capacitor according to another embodiment, the dielectric composition included in the first and second side margins 113 and 114 and the dielectric composition included in the ceramic body 110 are different from each other. The content ratio of the terbium (Tb) included in the first and second side margins 113 and 114 is adjusted to be higher than the content ratio of terbium (Tb) included in the ceramic body 110, thereby to provide an effect according to an embodiment of the present disclosure.

In detail, according to another embodiment, the interfacial adhesion between the internal electrode and the margin portion may be prevented from being lowered, and the formation of voids between the internal electrode and the margin portion may be prevented, thereby improving reliability.

In addition, uniform oxide layer and insulating layer may be formed on the end of the internal electrode, to reduce short defects, to improve the density of the margin portion, and to improve the mechanical strength of the multilayer ceramic capacitor and improve the high temperature/moisture reliability.

Hereinafter, a method of manufacturing a multilayer ceramic capacitor according to another embodiment will be described.

FIGS. 5A to 5F are cross-sectional views and perspective views schematically illustrating a method of manufacturing a multilayer ceramic capacitor according to another embodiment.

Figure 5A:
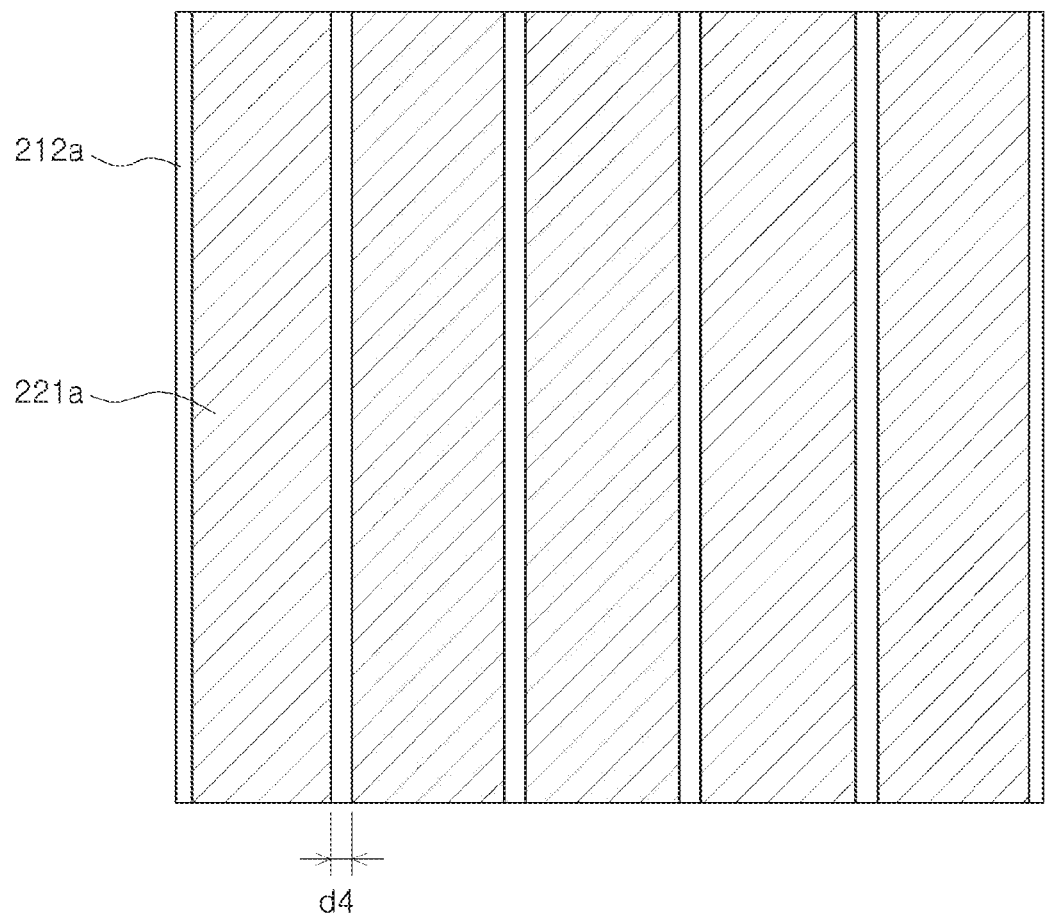
FIGS. 5A to 5F are cross-sectional views and perspective views schematically illustrating a method of manufacturing a multilayer ceramic capacitor according to another embodiment.

As illustrated in FIG. 5A, a plurality of stripe-type first internal electrode patterns 221a are formed on a ceramic green sheet 212a at a predetermined interval d4. The plurality of stripe-type first internal electrode patterns 221a may be formed in parallel to each other.

The predetermined interval d4 is a distance for the internal electrodes to be insulated from the external electrode, having different polarities, and may be understood as a distance of d2×2 illustrated in FIG. 4.

The ceramic green sheet 212a may be formed of a ceramic paste including ceramic powder, an organic solvent, and an organic binder.

The ceramic powder is a material having a high dielectric constant, and although not particularly limited, as the ceramic powder, a barium titanate ($BaTiO_3$)-based material, a lead composite perovskite-based material, a strontium titanate ($SrTiO_3$)-based material, or the like may be used, and in detail, barium titanate ($BaTiO_3$) powder may be used. When the ceramic green sheet 212a is fired, the ceramic green sheet 212a becomes the dielectric layer 112 constituting the ceramic body.

The stripe-type first internal electrode pattern 221a may be formed by an internal electrode paste containing a conductive metal. The conductive metal is not particularly limited, but may be nickel (Ni), copper (Cu), palladium (Pd), or alloys thereof.

The method of forming the stripe-type first internal electrode pattern 221a on the ceramic green sheet 212a is not particularly limited, but may be formed by, for example, a printing method such as a screen printing method or a gravure printing method.

Although not illustrated, a plurality of stripe-type second internal electrode patterns 222a (shown in FIG. 5B) may be formed on the other ceramic green sheet 212a at a predetermined interval.

Hereinafter, the ceramic green sheet on which the first internal electrode pattern 221a is formed may be referred to as a first ceramic green sheet, and the ceramic green sheet on which the second internal electrode pattern 222a is formed may be referred to as a second ceramic green sheet.

Figure 5B:
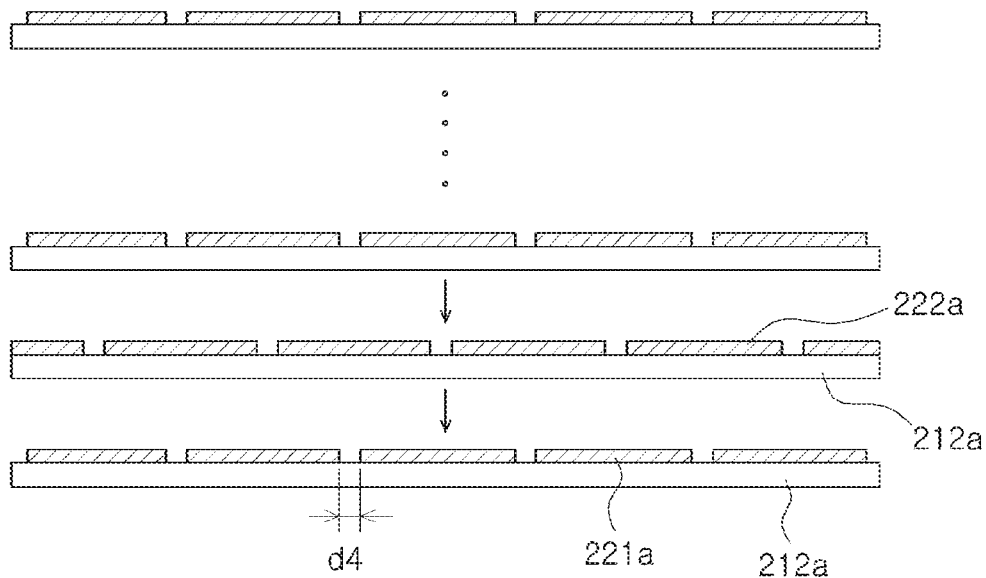

Next, as illustrated in FIG. 5B, the first and second ceramic green sheets may be alternately stacked so that the stripe-type first internal electrode patterns 221a and the stripe-type second internal electrode patterns 222a are alternately stacked.

Subsequently, the stripe first internal electrode pattern 221a may form the first internal electrode 121, and the stripe second internal electrode pattern 222a may form the second internal electrode 122.

Figure 5C:
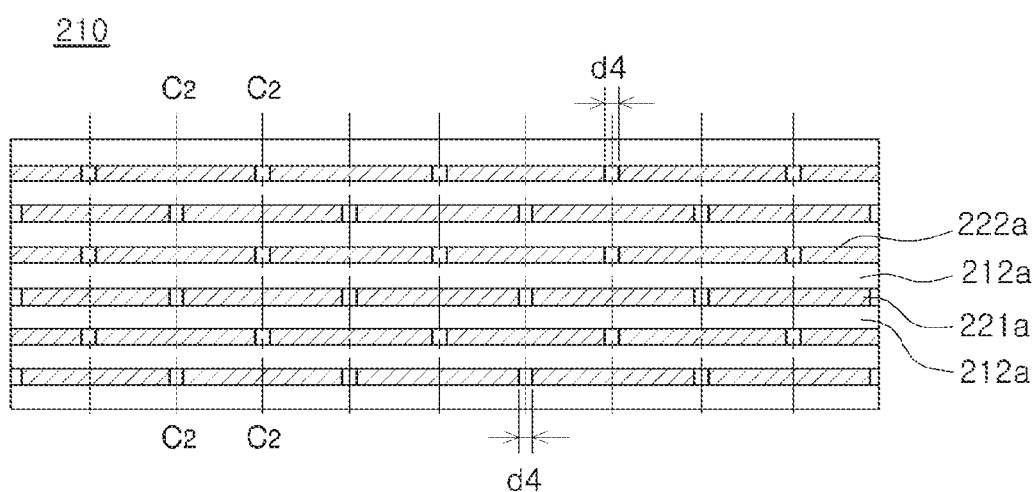
Figure 5D:
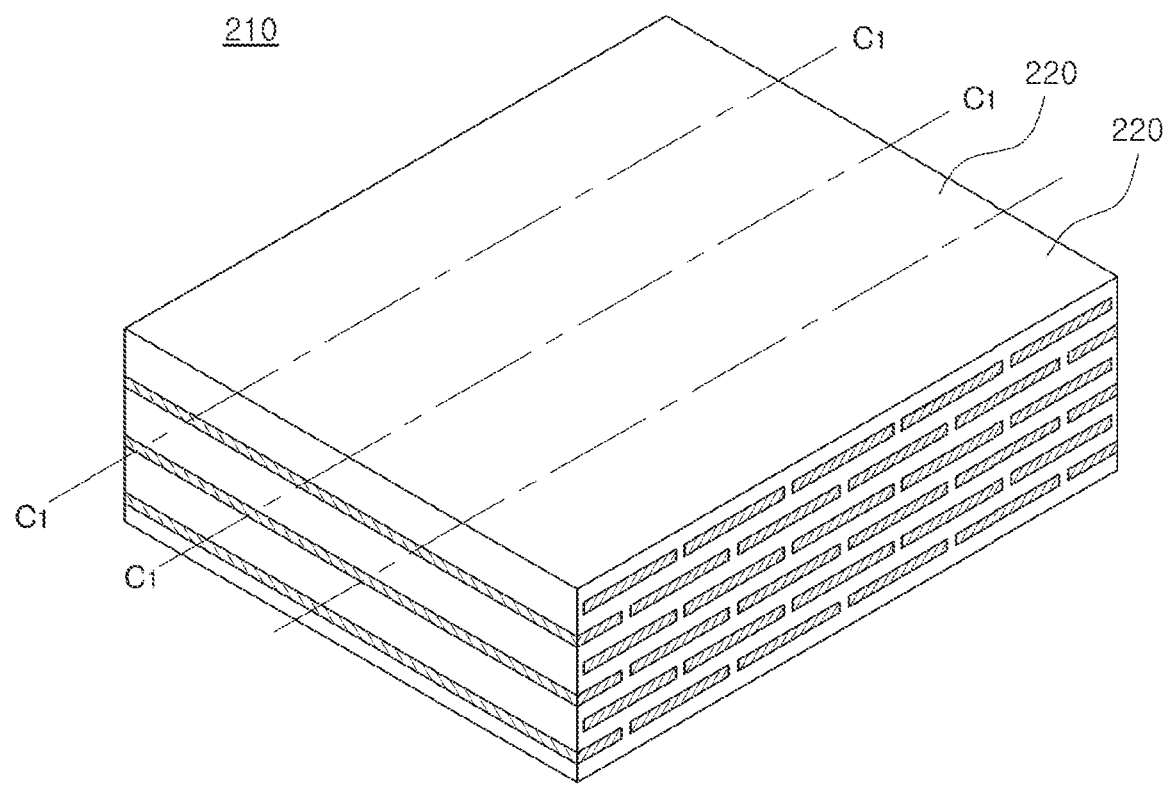

FIG. 5C is a cross-sectional view illustrating a ceramic green sheet laminate 210 in which the first and second ceramic green sheets are stacked according to an embodiment, and FIG. 5D is a perspective view of the ceramic green sheet laminate 210 in which the first and second ceramic green sheets are stacked.

Referring to FIGS. 5C and 5D, a first ceramic green sheet on which a plurality of parallel stripe-type first internal electrode patterns 221a are printed, and a second ceramic green sheet on which a plurality of parallel stripe-type second internal electrode patterns 222a are printed are alternately stacked.

In more detail, the green sheets may be stacked in such a manner that the center of the stripe-shaped first internal electrode pattern 221a printed on the first ceramic green sheet and the interval d4 between the stripe-type second internal electrode patterns 222a printed on the second ceramic green sheet overlap each other.

Next, as illustrated in FIG. 5D, the ceramic green sheet laminate 210 may be cut to transverse the plurality of stripe-type first internal electrode patterns 221a and the stripe-type second internal electrode patterns 222a. For example, the ceramic green sheet laminate 210 may be cut into bar laminates 220 along line C1-C1.

In more detail, the stripe-type first internal electrode pattern 221a and the stripe-type second internal electrode pattern 222a may be cut in the length direction and divided into a plurality of internal electrodes having a predetermined width. At this time, the stacked ceramic green sheets are also cut together with the internal electrode patterns. Accordingly, the dielectric layer may be formed to have the same width as that of the internal electrode.

Ends of the first and second internal electrodes may be exposed to the cut surface of the bar laminate 220. The cut surfaces of the bar laminate may be referred to as first and second sides of the bar laminate, respectively.

The ceramic green sheet laminate may be fired and may then be cut into the bar laminates. In addition, firing may be performed after the ceramic green sheet is cut into the bar laminates. Although not particularly limited, the firing may be performed in an $N_2$—$H_2$ atmosphere of 1100° C. to 1300° C.

Figure 5E:
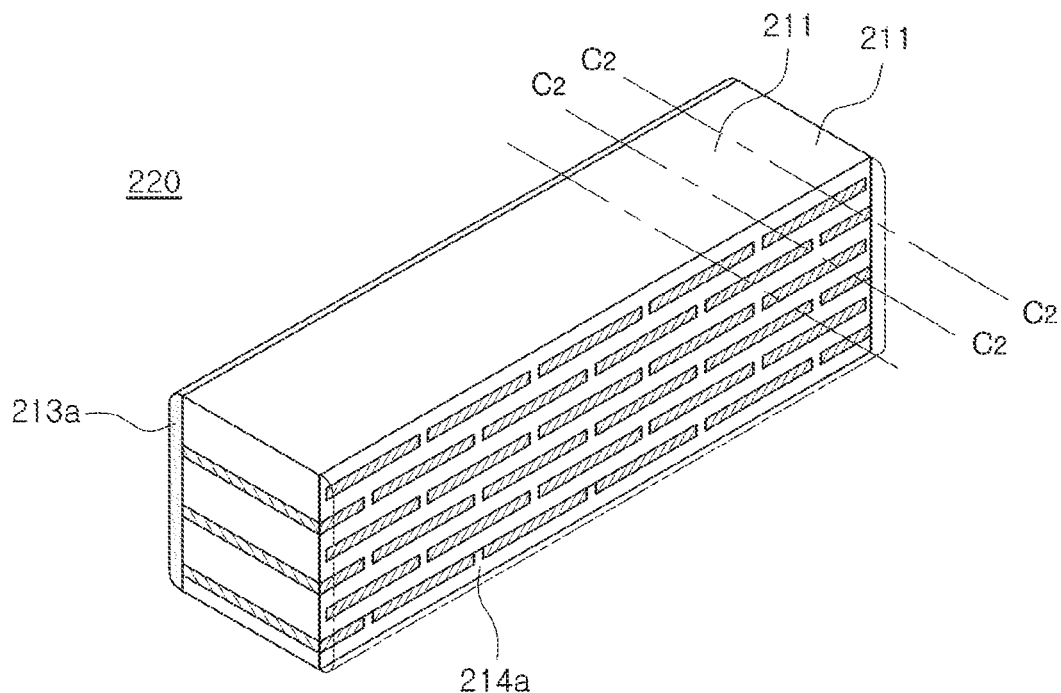

Next, as illustrated in FIG. 5E, a first side margin 213a and a second side margin 214a may be formed on the first and second side surfaces of the bar laminate 220, respectively. The second side margin 214a is not clearly illustrated, but is outlined in dotted line.

The first and second side margins 213a and 214a may be provided by forming a ceramic slurry including ceramic powder on the bar laminate 220.

The ceramic slurry may include a ceramic powder, an organic binder, and an organic solvent, and the amount of the ceramic slurry may be adjusted such that the first and second side margins 213a and 214a have a required thickness.

The first and second side margins 213a and 214a may be formed by applying a ceramic slurry to the first and second side surfaces of the bar laminate 220. The method of applying the ceramic slurry is not particularly limited, and may be applied by spraying or using a roller, for example.

In addition, the bar laminate may be dipped in the ceramic slurry to form the first and second side margins 213a and 214a on the first and second side surfaces of the bar laminate.

As described above, the thicknesses of the first and second side margins may be 18 μm or less.

Figure 5F:
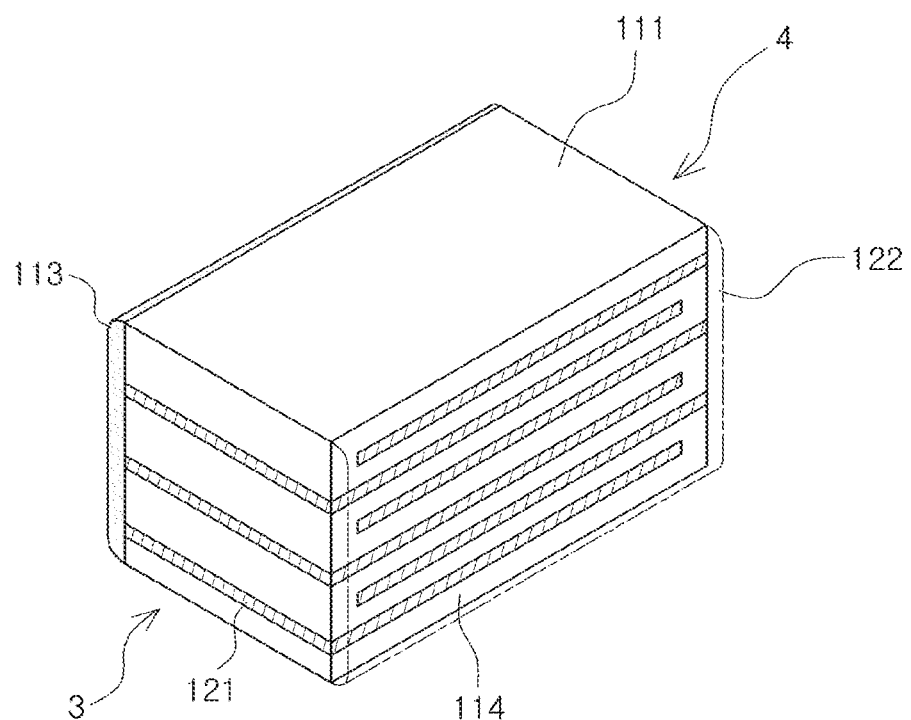

Next, as illustrated in FIGS. 5E and 5F, the bar laminate 220 having the first and second side margins 113a and 114a formed thereon may be cut into individual chips with respectively required sizes, along a C2-C2 cutting line. FIG. 5C may be referred to determine the position of the C2-C2 cutting line.

As the bar laminate 220 is cut into chip size, a ceramic body having a laminated body 111 and the first and second side margins 113 and 114 formed on both sides of the laminated body may be formed.

As the bar laminate 220 is cut along the C2-C2 cutting line, a center portion of the overlapped first and second internal electrodes, and the predetermined interval d4 between the second internal electrodes, may be cut by the same cutting line. From another point of view, a central portion of the second internal electrode, and a predetermined interval between the first internal electrodes, may be cut by the same cutting line.

Accordingly, one ends of the first internal electrode and the second internal electrode may be alternately exposed to the cutting surface along the C2-C2 cutting line. The surface to which the first internal electrode is exposed may be understood to be the third surface 3 of the laminate illustrated in FIG. 4, and the surface to which the second internal electrode is exposed may be understood to be the fourth surface 4 of the laminate illustrated in FIG. 4.

As the bar laminate 220 is cut along the C2-C2 cutting line, the predetermined interval d4 between the sprite-type first internal electrode patterns 221a is cut in half, such that one end of the first internal electrode 121 is spaced apart from the fourth surface by a predetermined interval d2. In addition, one end of the second internal electrode 122 is allowed to be spaced apart from the third surface by a predetermined interval d2.

Thereafter, an external electrode may be formed on each of the third and fourth surfaces to be connected to one ends of the first and second internal electrodes.

As in this embodiment, when the first and second side margins are formed on the bar laminate 220 and cut into chip sizes, the side margins may be formed on a plurality of laminated bodies 111 through one process.

In addition, although not illustrated, a plurality of laminates may be formed by cutting the bar laminate into chip sizes before forming the first side margin and the second side margin.

For example, the bar laminate may be cut, such that the central portion of the overlapping first internal electrode, and a predetermined interval between the second internal electrodes, are cut by the same cutting line. Accordingly, one ends of the first internal electrode and the second internal electrode may be alternately exposed to the cut surface.

Thereafter, the first side margin and the second side margin, made of the above described material, may be formed on the first and second surfaces of the laminated body. A method of forming the first and second side margins is as described above.

In addition, an external electrode may be formed on a third surface of the laminated body to which the first internal electrode is exposed and another external electrode may be formed on a fourth surface of the laminated body to which the second internal electrode is exposed.

According to another embodiment, the ends of the first and second internal electrodes are exposed through the first and second surfaces of the laminate. The plurality of stacked first and second internal electrodes may be simultaneously cut, and thus, the ends of the internal electrodes may be disposed on one straight line. Thereafter, first and second side margins are collectively formed on the first and second surfaces of the laminate. The ceramic body is formed by the laminate and the first and second side margins. For example, the first and second side margins form on the first and second side surfaces of the ceramic body, respectively.

Accordingly, according to this embodiment, the distance from the ends of the plurality of internal electrodes to the first and second surfaces of the ceramic body may be uniformly formed. In addition, the first and second side margins are formed by a ceramic paste, and may have a relatively thin thickness.

Hereinafter, an embodiment of the present disclosure will be described in more detail with reference to an experimental example. However, the scope of the present disclosure is not limited by the experimental example.

Experimental Example

As a base material main component, a $BaTiO_3$ powder of 100 nm or less was used, and a subcomponent composition in this case is illustrated in Table 1 below.

In preparing a slurry, the base material main component and subcomponent powder were mixed with ethanol/toluene and a dispersant by using zirconia balls as mixing/dispersing media, and then, mechanical milling was performed, and then a binder mixing process for implementing dielectric sheet strength was added.

The prepared slurry was manufactured into a sheet having a thickness of 10 to 20 μm to form a side margin using an on-roll coater of the head discharge method.

In addition, the sheet was attached to an electrode exposed portion of the green chip in which the internal electrode is exposed in the width direction and there is no margin, and was cut to have a size of 5 cm×5 cm to form the side margin.

A multilayer ceramic capacitor green chip of 0603 size (width×length×height: 0.6 mm×0.3 mm×0.3 mm) was fabricated by attaching the sheet to both sides of the chip by applying a constant temperature and pressure under the condition of significantly reducing chip deformation.

The fabricated multilayer ceramic capacitor specimen was subjected to a plasticizing process under nitrogen atmosphere at 400° C. or lower, and then subjected to firing under the conditions of firing temperature of 1200° C. or lower and hydrogen concentration of 0.5% $H_2$ or less. Then, electrical characteristics, insulation resistance, chip strength, the adhesion at the interface between the side margin and internal electrode and void filling therebetween, the degree of formation of insulation layer on the electrode end, the difference in the density of the side margins and the like were comprehensively confirmed.

Dielectric loss and the room temperature capacitance of the multilayer ceramic capacitor (MLCC) for each composition were measured at 1 kHz and AC 0.5 V, using an LCR meter, and 50 samples were taken to measure a breakdown voltage (BDV), which causes breakdown.

Side margin hardness of the multilayer ceramic capacitor (MLCC) was measured using a Vickers hardness tester under 5 kgf load and holding time of 5 sec. The microstructures such as a margin density and an insulation layer generation degree were compared for a fracture surface and a polishing surface of the chip.

Table 1 below is a dielectric composition table of Experimental Example (Comparative Examples and Embodiment Examples), and $BaTiO_3$ is used as a base material main component. In this case, as the subcomponent, an additional element in the form of a basic donor and acceptor constituting the multilayer ceramic capacitor (MLCC), and elements serving as a sintering aid including Ba—Si—Al were used.

At this time, to compare the densities of the side margins, the formation of an oxide layer on an electrode end, the void filling, and the interfacial adhesion according to Embodiment Examples of the present invention and Comparative Examples, the additive element content ratios were variously changed for respective subcomponents.

Table 2 below summarizes the electrical characteristics and microstructure results of the 0603 size multilayer ceramic capacitor (MLCC) corresponding to the composition specified in Table 1 above.

TABLE 1

| | Mole number of additive per 100 mol of BatiO3 base material | | | | | | | |
|---|---|---|---|---|---|---|---|---|
| | First Subcomponent | | Second Subcomponent | Third Subcomponent | | Main Subcomponent Ratio | | |
| | total Tb in | total RE in | | | | | | |
| Sample | $Tb_4O_7$ | $RE_2O_3$ | $MgCO_3$ | $BaCO_3$ | $SiO_2$ | Tb/RE | Mg/Ba | Mg/(Ba + Si) |
| *1 | 0.00 | 1.50 | 0.50 | 2.0 | 3.3 | — | 0.250 | 0.094 |
| 2 | 0.15 | 1.35 | 0.50 | 2.0 | 3.3 | 0.111 | 0.250 | 0.094 |
| 3 | 0.30 | 1.20 | 0.50 | 2.0 | 3.3 | 0.250 | 0.250 | 0.094 |
| 4 | 0.45 | 1.05 | 0.50 | 2.0 | 3.3 | 0.429 | 0.250 | 0.094 |
| 5 | 0.60 | 0.90 | 0.50 | 2.0 | 3.3 | 0.667 | 0.250 | 0.094 |
| 6 | 0.75 | 0.75 | 0.50 | 2.0 | 3.3 | 1.000 | 0.250 | 0.094 |
| 7 | 0.90 | 0.60 | 0.50 | 2.0 | 3.3 | 1.500 | 0.250 | 0.094 |
| 8 | 1.05 | 0.45 | 0.50 | 2.0 | 3.3 | 2.333 | 0.250 | 0.094 |
| *9 | 1.20 | 0.30 | 0.50 | 2.0 | 3.3 | 4.000 | 0.250 | 0.094 |

TABLE 1-continued

| | Mole number of additive per 100 mol of BatiO3 base material | | | | | | | |
|---|---|---|---|---|---|---|---|---|
| | First Subcomponent | | Second Subcomponent | Third Subcomponent | | Main Subcomponent Ratio | | |
| Sample | total Tb in Tb$_4$O$_7$ | total RE in RE$_2$O$_3$ | MgCO$_3$ | BaCO$_3$ | SiO$_2$ | Tb/RE | Mg/Ba | Mg/(Ba + Si) |
| *10 | 1.35 | 0.15 | 0.50 | 2.0 | 3.3 | 9.000 | 0.250 | 0.094 |
| *11 | 1.50 | 0.00 | 0.50 | 2.0 | 3.3 | — | 0.250 | 0.094 |
| *12 | 0.45 | 1.05 | 0.0 | 2.0 | 3.3 | 0.429 | 0.000 | 0.000 |
| *13 | 0.45 | 1.05 | 0.25 | 2.0 | 3.3 | 0.429 | 0.125 | 0.047 |
| 14 | 0.45 | 1.05 | 0.75 | 2.0 | 3.3 | 0.429 | 0.375 | 0.142 |
| 15 | 0.45 | 1.05 | 1.00 | 2.0 | 3.3 | 0.429 | 0.500 | 0.189 |
| *16 | 0.45 | 1.05 | 0.75 | 0.5 | 3.3 | 0.429 | 1.500 | 0.197 |
| *17 | 0.45 | 1.05 | 0.75 | 1.0 | 3.3 | 0.429 | 0.750 | 0.174 |
| 18 | 0.45 | 1.05 | 0.75 | 1.5 | 3.3 | 0.429 | 0.500 | 0.156 |
| 19 | 0.45 | 1.05 | 0.75 | 2.5 | 3.3 | 0.429 | 0.300 | 0.129 |
| 20 | 0.45 | 1.05 | 0.75 | 3.0 | 3.3 | 0.429 | 0.250 | 0.119 |
| *21 | 0.45 | 1.05 | 0.75 | 2.5 | 1.5 | 0.429 | 0.300 | 0.191 |
| *22 | 0.45 | 1.05 | 0.75 | 2.5 | 4.5 | 0.429 | 0.300 | 0.107 |

TABLE 2

| | Structural Characteristics | | | | | | | Electrical Characteristics | | | |
|---|---|---|---|---|---|---|---|---|---|---|---|
| Sample | Depth of Oxide Layer on Electrode Ends | Interfacial void filling rate | Density of Margin | Interfacial Adhesion | Body Strength of Margin | Smoothness of Electrode End | Dielectric and thickness uniformity | Dielectric constant | High temperature withstand voltage | Moisture resistance reliability | Short Rate |
| *1 | Δ | X | X | X | X | X | X | ○ | X | X | X |
| 2 | Δ | ○ | Δ | ○ | Δ | Δ | Δ | ○ | Δ | Δ | Δ |
| 3 | Δ | Δ | ○ | Δ | ○ | ○ | ○ | ○ | ○ | ○ | ○ |
| 4 | Δ | ○ | ◎ | ○ | ◎ | ○ | ○ | ○ | ○ | ◎ | ○ |
| 5 | Δ | ○ | ◎ | ○ | ◎ | ○ | ○ | ○ | Δ | ○ | ○ |
| 6 | Δ | ○ | ○ | ○ | ○ | ○ | ○ | ○ | Δ | Δ | ○ |
| 7 | Δ | ○ | ○ | ○ | ○ | ○ | ○ | ○ | Δ | Δ | Δ |
| 8 | Δ | ○ | ○ | ○ | ○ | ○ | ○ | ○ | Δ | Δ | Δ |
| 9 | Δ | ○ | ○ | ○ | ○ | Δ | Δ | ○ | X | X | X |
| *10 | Δ | Δ | Δ | Δ | Δ | X | X | ○ | X | X | X |
| *11 | Δ | X | X | X | X | X | X | ○ | X | X | X |
| *12 | X | X | Δ | Δ | Δ | X | X | ◎ | X | X | X |
| *13 | X | Δ | Δ | Δ | Δ | X | X | ◎ | ○ | ○ | Δ |
| 14 | ◎ | ◎ | ◎ | ◎ | ◎ | ○ | ○ | ○ | ◎ | ◎ | ◎ |
| 15 | ◎ | ◎ | ◎ | ◎ | ◎ | ◎ | ◎ | Δ | ○ | ○ | ○ |
| *16 | ◎ | Δ | Δ | Δ | Δ | X | X | Δ | X | X | X |
| *17 | ◎ | Δ | ○ | Δ | Δ | Δ | Δ | Δ | Δ | X | Δ |
| 18 | ◎ | ○ | ◎ | ○ | ◎ | ○ | ○ | ○ | Δ | ○ | ○ |
| 19 | ◎ | ◎ | ◎ | ◎ | ◎ | ◎ | ◎ | ○ | ◎ | ◎ | ◎ |
| 20 | ◎ | ○ | ○ | ○ | ○ | ○ | ○ | ○ | ○ | ○ | ◎ |
| *21 | ◎ | Δ | Δ | Δ | Δ | X | X | Δ | X | X | X |
| *22 | ◎ | ◎ | Δ | ○ | Δ | Δ | Δ | Δ | Δ | Δ | X |

◎: Excellent,
○: Good,
Δ: Normal,
X: Poor

As illustrated in Table 1 and Table 2, when the ratio of terbium (Tb) in the rare earth element increases to a certain level or more, the interface void filling effect may be obtained by improving the body density and body strength and improving the material transfer driving force of the body. The content ratio of the terbium (Tb) to the content of the first subcomponent (RE), excluding the terbium (Tb), may be up to 9.0.

However, in consideration of the high temperature and moisture resistance reliability of the multilayer ceramic capacitor, in case of terbium (Tb) having a strong donor type tendency, in the case in which the content ratio is excessively high, leakage current increases due to the electron emission phenomenon generated by a defect chemical reaction equation. Since a side effect accompanied by a decrease in dielectric layer insulation resistance occurs, the content ratio of the terbium (Tb) to the content of the first subcomponent (RE) excluding the terbium (Tb) may satisfy 0.110≤Tb/RE≤2.333, to simultaneously obtain the effects of densification of the body and the increase of insulation resistance of the dielectric layer.

In addition, the content ratio of the magnesium (Mg) to the content of the barium (Ba) may satisfy 0.125≤Mg/Ba≤0.500.

By adjusting the content ratio of the magnesium (Mg) to the content of the barium (Ba) to satisfy 0.125≤Mg/

Ba≤0.500, the degradation of the interfacial adhesion between the internal electrode and the margin may be prevented, and the generation of voids between the internal electrode and the margin may be prevented, thereby improving the reliability.

In addition, a uniform oxide layer and insulating layer on the end of the internal electrode may be secured, to reduce short defects, to improve the density of the margin portion, and to improve the mechanical strength of the multilayer ceramic capacitor and improve the high temperature/moisture resistance reliability.

In the case of samples 12, 16 and 17, the content ratio of magnesium (Mg) to the content of barium (Ba) is outside the numerical range according to an embodiment of the present disclosure. In this case, the margin density decreases, the interfacial voids occur, and the thickness uniformity on the dielectric and internal electrode ends may be lowered. Further, a decrease in dielectric properties may occur.

On the other hand, the content ratio of magnesium (Mg) to the total content of barium (Ba) and silicon (Si) may satisfy $0.09 \leq Mg/(Ba+Si) \leq 0.19$.

In an embodiment in which the content ratio of magnesium (Mg) to the total content of the barium (Ba) and silicon (Si) satisfies $0.09 \leq Mg/(Ba+Si) \leq 0.19$, void generation between the internal electrode and the margin portion may be prevented, and thus, it can be seen that the reliability may be improved.

In addition, the uniform oxide layer and insulating layer on the end of the internal electrode may be secured, to reduce short defects, to improve the density of the margin portion, and to improve the mechanical strength of the multilayer ceramic capacitor. Therefore, it can be seen that the high temperature/moisture resistance reliability may be improved.

In the case of Sample 13 in which the content ratio (Mg/(Ba+Si)) of magnesium (Mg) to the total content of barium (Ba) and silicon (Si) is less than 0.09, there is a problem in which the margin density decreases, the interfacial voids are generated, and the thickness uniformity on the internal electrode end decreases, thereby causing a decrease in reliability.

In the case of Sample 21 in which the content ratio (Mg/(Ba+Si)) of magnesium (Mg) to the total content of barium (Ba) and silicon (Si) exceeds 0.19, excessive diffusion of magnesium (Mg) into the active dielectric layer degrades dielectric properties.

In the case of sample 22, the content of silicon (Si) is out of the numerical range according to an embodiment of the present disclosure, which may cause problems of degrading sintering properties and density, and short generation.

As set forth above, according to an embodiment, after fabricating the chip in such a manner that the internal electrode is exposed in the width direction of the body, a decrease in the interfacial adhesion between the internal electrodes and the margins, occurring during the multilayer ceramic capacitor manufacturing process in which the margins are separately attached to the electrode exposed surface of the chip in the width direction, in operation before firing, may be prevented.

In addition, in the multilayer ceramic capacitor manufactured by the above manufacturing process, the generation of voids between the internal electrode and the margin portion may be prevented, thereby improving the reliability.

In addition, uniform oxide layer and insulating layer may be secured on the end of the internal electrode, thereby reducing short defects.

In addition, the density of the margin portion may be improved, thereby improving the mechanical strength of the multilayer ceramic capacitor and improving the high temperature/moisture resistance.

The internal electrode is formed entirely in the width direction of the dielectric layer, and is exposed to the side of the body in the width direction, and then, the margins are attached separately, thereby significantly increasing the overlapping area between the internal electrodes to implement a high capacity multilayer ceramic capacitor, and reducing the occurrence of step difference.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer ceramic capacitor comprising:
   a ceramic body including first and second surfaces opposing each other, and third and fourth surfaces connecting the first and second surfaces;
   a plurality of internal electrodes disposed inside the ceramic body, exposed from the first and second surfaces, and having an end exposed from the third surface or the fourth surface; and
   a first side margin and a second side margin respectively disposed on the first and second surfaces, from which end portions of the plurality of internal electrodes are exposed,
   wherein the first and second side margins include a barium titanate-based base material, and a subcomponent,
   wherein the subcomponent includes terbium (Tb) as a first subcomponent including a lanthanide rare earth element, and a content ratio of the terbium (Tb) to a content of the first subcomponent (RE) excluding the terbium (Tb) satisfies $0.110 \leq Tb/RE \leq 2.333$
   wherein the subcomponent further comprises:
   magnesium (Mg) and barium (Ba);
   a second subcomponent including a carbonate or an oxide comprising magnesium (Mg); and
   a third subcomponent having a content greater than 0.0 and less than 4.5 mol containing at least one of an oxide or carbonate comprising at least one of silicon (Si), barium (Ba) or aluminum (Al), or a glass compound comprising Si, with respect to 100 mol of the barium titanate-based base material, and
   wherein a content ratio of the magnesium (Mg) to the total content of the barium (Ba) and silicon (Si) satisfies $0.09 \leq Mg/(Ba+Si) \leq 0.19$.

2. The multilayer ceramic capacitor of claim 1, wherein a content of the terbium (Tb) satisfies $0.15$ mol $\leq Tb \leq 1.35$ mol with respect to 100 mol of the barium titanate-based base material.

3. The multilayer ceramic capacitor of claim 1, wherein a content ratio of magnesium (Mg) to a content of barium (Ba) of the subcomponent satisfies 0.125≤Mg/Ba≤0.500.

4. The multilayer ceramic capacitor of claim 1, wherein the content of magnesium (Mg) satisfies 0.25 mol≤Mg≤1.0 mol with respect to 100 mol of the barium titanate-based base material.

5. The multilayer ceramic capacitor of claim 1, wherein the content of barium (Ba) of the subcomponent satisfies 0.5 mol≤Ba≤3.0 mol with respect to 100 mol of the barium titanate-based base material.

6. The multilayer ceramic capacitor of claim 1, wherein the subcomponent comprises the first subcomponent in an amount greater than 0.0 and 4.0 mol or less with respect to 100 mol of the barium titanate-based base material powder, the first subcomponent being an oxide or carbonate including at least one of yttrium (Y), dysprosium (Dy), holmium (Ho), erbium (Er), gadolinium (Gd), cerium (Ce), neodymium (Nd), samarium (Sm), lanthanum (La), ytterbium (Yb) or praseodymium (Pr).

7. The multilayer ceramic capacitor of claim 1, wherein a dielectric composition included in the first and second side margins and a dielectric composition included in the ceramic body are different.

8. A multilayer ceramic capacitor comprising:
a ceramic body including first and second surfaces opposing each other, and third and fourth surfaces connecting the first and second surfaces;
a plurality of internal electrodes disposed inside the ceramic body, exposed from the first and second surfaces, and each having an end exposed from the third surface or the fourth surface; and
a first side margin and a second side margin respectively disposed on the first and second surfaces, from which end portions of the plurality of internal electrodes are exposed,
wherein the first and second side margins include a barium titanate-based base material, and a subcomponent,
wherein the subcomponent includes terbium (Tb) as a first subcomponent including a lanthanide rare earth element,
wherein a content ratio of the terbium (Tb) to a content of the first subcomponent (RE) excluding the terbium (Tb) satisfies 0.110≤Tb/RE≤2.333, and
wherein a content ratio of the terbium (Tb) included in the first and second side margins to a content of the barium titanate-based base material included in the first and second side margins, is greater than a content ratio of terbium (Tb) included in the ceramic body to a content of a barium titanate-based base material included in the ceramic body.

9. The multilayer ceramic capacitor of claim 8, wherein the content of terbium (Tb) included in the first and second side margin satisfies 0.15 mol ≤Tb≤1.35 mol with respect to 100 mol of the barium titanate-based base material included in the first and second side margins.

10. The multilayer ceramic capacitor of claim 8, wherein the subcomponent further comprises magnesium (Mg) and barium (Ba), and a content ratio of magnesium (Mg) to a content of barium (Ba) in the subcomponent satisfies 0.125≤Mg/Ba≤0.500.

11. The multilayer ceramic capacitor of claim 10, wherein the content of magnesium (Mg) satisfies 0.25 mol≤Mg≤1.0 mol with respect to 100 mol of the barium titanate-based base material included in the first and second side margins.

12. The multilayer ceramic capacitor of claim 10, wherein the content of barium (Ba) satisfies 0.5 mol≤Ba≤3.0 mol with respect to 100 mol of the barium titanate-based base material included in the first and second side margins.

13. The multilayer ceramic capacitor of claim 10, wherein the subcomponent further comprises:
a second subcomponent including an oxide or carbonate comprising the Mg; and
a third subcomponent having a content greater than 0.0 and less than 4.5 mol containing at least one of an oxide or carbonate comprising at least one of silicon (Si), barium (Ba) or aluminum (Al), or a glass compound comprising Si, with respect to 100 mol of the barium titanate-based base material included in the first and second side margins,
wherein a content ratio of the magnesium (Mg) to a total content of the barium (Ba) and silicon (Si) satisfies 0.09≤Mg/(Ba+Si)≤0.19.

14. The multilayer ceramic capacitor of claim 8, wherein the subcomponent comprises the first subcomponent in an amount greater than 0.0 and 4.0 mol or less with respect to 100 mol of the barium titanate-based base material included in the first and second side margins, the first subcomponent being an oxide or carbonate including at least one of Y, Dy, Ho, Er, Gd, Ce, Nd, Sm, La, Yb or Pr.

15. A multilayer ceramic capacitor comprising:
a ceramic body including first and second surfaces opposing each other, and third and fourth surfaces connecting the first and second surfaces;
a plurality of internal electrodes disposed inside the ceramic body, exposed from the first and second surfaces, and each having an end exposed from the third surface or the fourth surface; and
a first side margin and a second side margin respectively disposed on the first and second surfaces, from which end portions of the plurality of internal electrodes are exposed,
wherein the first and second side margins include a barium titanate-based base material and a subcomponent,
wherein the subcomponent includes terbium (Tb) and one or more other lanthanide rare earth elements as a first subcomponent,
wherein a content ratio of the terbium (Tb) included in the first and second side margins to a content of the barium titanate-based base material included in the first and second side margins, is greater than a content ratio of terbium (Tb) included in the ceramic body to a content of a barium titanate-based base material included in the ceramic body, and
wherein a content of the terbium (Tb) satisfies 0.15 mol≤Tb≤1.35 mol with respect to 100 mol of the barium titanate-based base material included in the first and second side margins.

16. The multilayer ceramic capacitor of claim 15, wherein the subcomponent further comprises magnesium (Mg) and barium (Ba), and a content ratio of magnesium (Mg) to a content of barium (Ba) in the subcomponent satisfies 0.125≤Mg/Ba≤0.500.

17. The multilayer ceramic capacitor of claim 16, wherein the content of magnesium (Mg) satisfies 0.25 mol≤Mg≤1.0 mol with respect to 100 mol of the barium titanate-based base material included in the first and second side margins.

18. The multilayer ceramic capacitor of claim 16, wherein the content of barium (Ba) satisfies 0.5 mol≤Ba≤3.0 mol with respect to 100 mol of the barium titanate-based base material included in the first and second side margins.

19. The multilayer ceramic capacitor of claim 16, wherein the subcomponent further comprises:
- a second subcomponent including an oxide or carbonate comprising the Mg; and
- a third subcomponent having a content greater than 0.0 and less than 4.5 mol containing at least one of an oxide or carbonate comprising at least one of silicon (Si), barium (Ba) or aluminum (Al), or a glass compound comprising Si, with respect to 100 mol of the barium titanate-based base material included in the first and second side margins,
- wherein a content ratio of the magnesium (Mg) to a total content of the barium (Ba) and silicon (Si) satisfies $0.09 \leq Mg/(Ba+Si) \leq 0.19$.

20. The multilayer ceramic capacitor of claim 15, wherein the subcomponent comprises the first subcomponent in an amount greater than 0.0 and 4.0 mol or less with respect to 100 mol of the barium titanate-based base material included in the first and second side margins, the first subcomponent being an oxide or carbonate including at least one of Y, Dy, Ho, Er, Gd, Ce, Nd, Sm, La, Yb or Pr.

* * * * *